US007932809B2

(12) United States Patent
Nair et al.

(10) Patent No.: US 7,932,809 B2
(45) Date of Patent: *Apr. 26, 2011

(54) RFID/BIOMETRIC AREA PROTECTION

(75) Inventors: Suresh Nair, Amhurst, NH (US); James E. Dogul, Hudson, NH (US); Richard Galera, Nashua, NH (US); George E. Rollins, Chelmsford, MA (US); Derek W. Jones, Borgue (GB); George K. Schuster, Royal Oak, MI (US); Ray C. Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 927 days.

This patent is subject to a terminal disclaimer.

(21) Appl. No.: 11/360,970

(22) Filed: Feb. 23, 2006

(65) Prior Publication Data
US 2007/0205861 A1    Sep. 6, 2007

(51) Int. Cl.
*G06K 19/00* (2006.01)

(52) U.S. Cl. ....... 340/5.2; 340/5.61; 340/5.64; 235/375; 235/376; 700/12; 700/13; 700/17; 700/18; 83/58; 83/76; 30/419

(58) Field of Classification Search .... 340/573.1–573.7, 340/5.2–7.74; 700/11, 95, 12, 13, 17, 18; 83/58–68, 76; 30/419; 235/375, 376
See application file for complete search history.

(56) References Cited

U.S. PATENT DOCUMENTS

| | | | |
|---|---|---|---|
| 4,075,961 A * | 2/1978 | Harris | 112/277 |
| 4,476,468 A * | 10/1984 | Goldman | 340/5.86 |
| 5,317,309 A * | 5/1994 | Vercellotti et al. | 340/10.5 |
| 5,629,981 A * | 5/1997 | Nerlikar | 713/168 |
| 5,796,341 A | 8/1998 | Stratiotis | |
| 6,553,268 B1 * | 4/2003 | Schwenke et al. | 700/18 |
| 6,717,514 B1 * | 4/2004 | Stein et al. | 340/539.1 |
| 6,812,846 B2 | 11/2004 | Gutta et al. | |
| 6,812,849 B1 | 11/2004 | Ancel | |
| 6,995,673 B1 | 2/2006 | Osredkar et al. | |
| 7,151,445 B2 * | 12/2006 | Medve et al. | 340/539.15 |
| 7,246,746 B2 * | 7/2007 | McNamara et al. | 235/385 |
| 7,286,057 B2 * | 10/2007 | Bolling | 340/573.1 |
| 7,336,243 B2 * | 2/2008 | Jo et al. | 343/895 |
| 7,475,812 B1 * | 1/2009 | Novozhenets et al. | 235/382 |
| 7,607,014 B2 * | 10/2009 | Larson et al. | 713/168 |
| 2002/0017178 A1 * | 2/2002 | Gass et al. | 83/58 |
| 2004/0010326 A1 * | 1/2004 | Schuster | 700/79 |
| 2005/0110610 A1 | 5/2005 | Bazakos et al. | |

(Continued)

OTHER PUBLICATIONS

International Search Report for PCT Patent Application No. US07/62756, dated Jan. 30, 2008, 2 pages.

*Primary Examiner* — Daniel Wu
*Assistant Examiner* — Ryan W Sherwin
(74) *Attorney, Agent, or Firm* — Turocy & Watson LLP; William R. Walbrun; John M. Miller

(57) ABSTRACT

The claimed subject matter provides a system and/or a method that facilitates providing a safety mechanism associated with a protective zone in an industrial automation environment. An radio frequency identification (RFID) component can receive data from an RFID tag to identify a location. A safety component can employ a safe mode to a device based at least in part upon the location to employ a protected zone in proximity with the device.

29 Claims, 12 Drawing Sheets

U.S. PATENT DOCUMENTS

| | | |
|---|---|---|
| 2005/0116021 A1 | 6/2005 | O'Dougherty et al. |
| 2005/0171789 A1 | 8/2005 | Mathrubutham et al. |
| 2005/0253683 A1 | 11/2005 | Lowe |
| 2005/0272445 A1 | 12/2005 | Becker |
| 2005/0274463 A1 | 12/2005 | Becker |
| 2006/0025897 A1 | 2/2006 | Shostak et al. |
| 2006/0202804 A1* | 9/2006 | Vijay-Pillai et al. ........ 340/10.33 |
| 2007/0096870 A1* | 5/2007 | Fisher .......................... 340/5.53 |
| 2007/0205860 A1* | 9/2007 | Jones et al. .................. 340/5.61 |

* cited by examiner

RFID/BIOMETRIC AREA PROTECTION

TECHNICAL FIELD

The claimed subject matter is related to RFID technology, and more specifically to RFID tags utilized within an industrial automation system.

BACKGROUND

An evolving technology that is rapidly gaining interest is Radio Frequency Identification (RFID), which leverages electronic data to mitigate data reading (e.g., scanning bar codes) and/or opening containers to obtain product information. RFID technology leverages electronic data and wireless communications for identification purposes. With RFID systems, electronic data typically is stored within an RFID tag, which can be formed from a small silicon chip and one or more antennas and affixed to a product. Reading from and/or writing to an RFID tag can be achieved through radio frequency (RF) based wireless communication via devices referred to as RFID readers. An RFID reader is a device that can be utilized to read and/or write RFID tag data, depending on read/write privileges.

In general, writing is utilized to add and/or modify product-specific information to an RFID tag, and reading is utilized to retrieve the information, for example, to provide for automatic product identification. In many instances, the electronic data written to and/or read from an RFID tag includes an Electronic Product Code (EPC), as well as other product-related data. The EPC, in general, is a unique number that is encoded (e.g., as a bit code) and embedded within the RFID tag (a small silicon chip with one or more antennas) affixed to an associated product. Typical EPC data can include information about the associated product (e.g., product type, date of manufacture, lot number, source data, destination data, unique product code, . . . ) and/or associated pallets, boxes, cases and/or container levels, for example.

In today's highly sophisticated, complex and intelligent industrial automation systems, RFID technology is becoming an increasingly important presence for logistics concerns, material handling and inventory management. When implementing an RFID solution in a distribution center or a factory, it is customary to utilize three distinct platforms: an RFID reader/antenna (e.g., a fixed implementation), RFID "middleware" software running on a standard PC (Personal Computer), and an industrial controller (e.g., a PLC-Programmable Logic Controller). A traditional communications approach is to have the RFID reader connect to the controller via a network using, for example, RS-232 serial communications, Ethernet, or any of the field buses such as DeviceNet, ControlNet, etc. Thus, data read from the RFID tag can be utilized to provide a greater degree of certainty over what goes into a supply chain, location of various items and/or people, and how to manage raw materials, warehouse inventory, shipments, logistics, and/or various other aspects of manufacturing.

The industrial automation systems can employ complex and oftentimes dangerous equipment in order to effectuate the production of various items. For example, to create an automobile door, sheet metal must be cut in a desired shape by large cutting devices. Without adequate safety mechanisms, one or more individuals may become seriously injured and/or disfigured by accidentally placing a body part in an improper place at an inopportune time. Thus, many industrial devices are associated with safety mechanisms that cause such devices to automatically shut down when an individual or object is detected in an improper position.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate employing a safety mechanism that establishes a protective zone and/or area and/or provides access to the protective zone and/or area. An RFID component can transfer data from an RFID tag via wireless communication, wherein the RFID tag can include data related to location and/or proximity that can be utilized by a safety component. The safety component can implement a safe mode to provide a protected zone in connection with a device based at least in part upon the data associated with the RFID tag. The safety component can further provide access and/or denial to an area. It is to be appreciated and understood that the RFID tag can be a passive RFID tag, and in particular a passive UHF tag. The RFID component can be, but is not limited to, various components that read, write, receive, and/or store electronic product data, such as, readers, writers and/or servers, and can be a handheld device, incorporated into a device, a badge, a pass, an identification card, an access pass, a keycard, a nametag, and a driver's license, an identification item, or a fixed-mount device depending on the particular application and/or location within an industrial automation environment.

The safety component can provide any suitable manipulation to the device and/or an industrial automation process associated to the device based at least in part upon the wirelessly received data from the RFID tag. The safety component can invoke at least one of the following: an access to a particular area; a denial to a particular area; a mode of operation for a device; a mode of operation for a device based on a pre-defined range in proximity to a device; a tracking of the RFID tag; a limit (e.g., torque, speed, position, temperature, etc.) on a device that can manage and/or control a hazard; and a verification of the RFID tag. The device can include any suitable device within an industrial automation environment that can pose a threat, danger, and/or hazardous condition. For example, the device can be, but is not limited to, a blade, a door, a press, a robot, welder, a machine, a roller, a welder, a laser, a scanner, a belt conveyor, a pump, a press, a fan, a fly-wheel, a movable machine part, a vent for harmful fumes, a drain for harmful material, a heat source, a cold source, a container with a material (e.g., safe mode allows material to be maintained at a safe level), an electrical source, etc.

In accordance with another aspect of the innovation described herein, the safety component can further utilize a sensor in conjunction with the RFID tag and the RFID component to aid in invoking the safe mode to the device and providing the protected zone. The sensor can be any suitable sensor utilized within the automation industry such as, but not limited to, an optical sensor, a motion sensor, a safety mat, area scanners, a light curtain, etc. In other words, the sensor can be utilized to invoke the wireless transmission of data from the RFID tag to the RFID component based on activation of such sensor.

In accordance with one aspect of the claimed subject matter, the automation device can be controlled by a controller. The controller can include software and/or hardware components having inputs and/or outputs that can be programmed to deliver/receive automation manufacturing-related data. Moreover, the controller can include an internal database and/or data store that provide storage of data to invoke efficient access to RFID related information.

In accordance with another aspect of the claimed subject matter, the RFID tag can be a passive tag that utilizes ultra high frequency (UHF), wherein a power source is not included on the RFID tag. Moreover, the RFID tag data can include at least one of a tag identification, user data, extended data, user defined data, reader identification, security data, location data, biometric data, access data, personal data, and automation environment data, etc. The RFID tag can then be associated with a badge, a pass, an identification card, an access pass, a keycard, a nametag, and a driver's license, etc.

In accordance with an aspect of the subject innovation, the safety component can further employ a verify component that employs a verification technique to ensure the RFID tag is associated with a correct entity. Furthermore, the safety component can utilize a track component that tracks the location and/or proximity of the RFID tag. In other aspects of the claimed subject matter, methods are provided that facilitate employing a safety mechanism utilizing RFID technology within an industrial automation environment.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
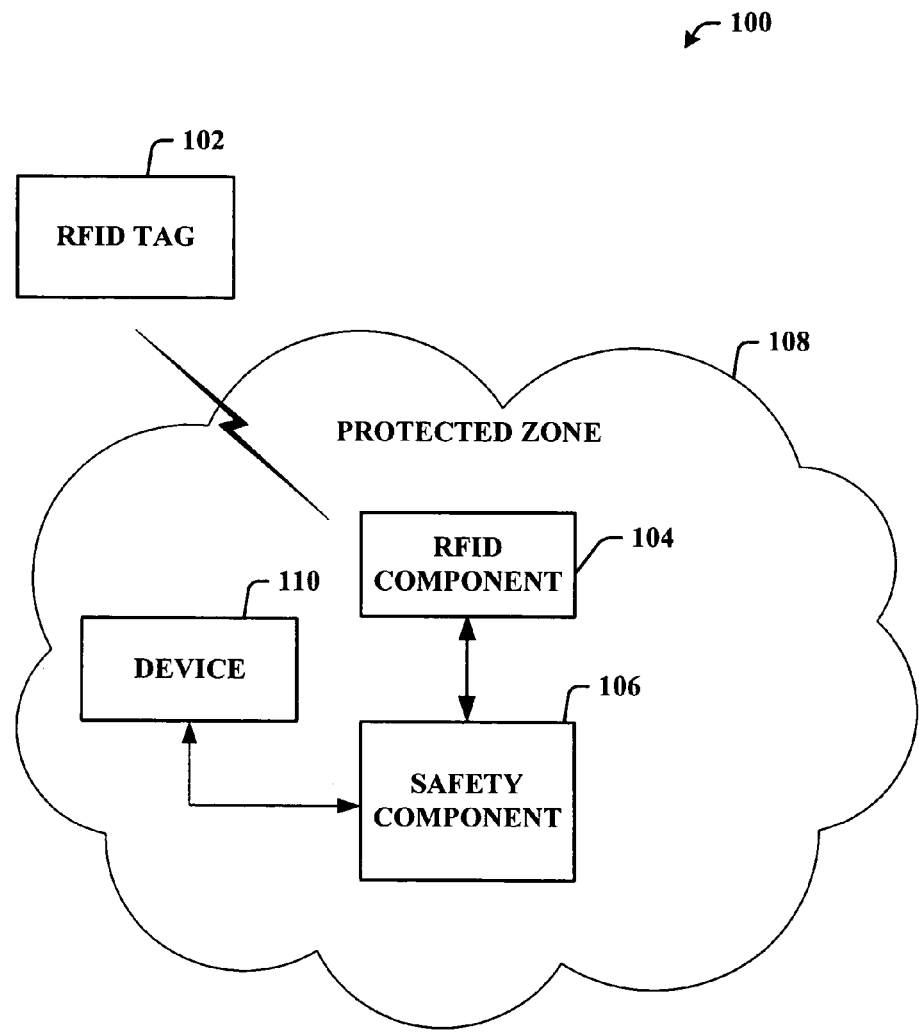
FIG. 1 illustrates a block diagram of an exemplary system that facilitates employing a safety mechanism that establishes a protective zone and/or area.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the innovation.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates employing a safety mechanism that establishes a protective zone and/or area. An RFID component 104 can transfer data from an RFID tag 102 via wireless communication, wherein the RFID tag 102 can include data related to location and/or proximity that can be utilized by a safety component 106. The safety component 106 can implement a safe mode to provide a protected zone 108 in connection with a device 110 based at least in part upon the data associated with the RFID tag 102. It is to be appreciated and understood that the RFID tag 102 can be a passive RFID tag, and in particular a passive UHF tag. The RFID component 104 can be, but is not limited to, various components that read, write, receive, and/or store electronic product data, such as, readers, writers and/or servers, and can be a handheld device, incorporated into a device, a badge, a badge, a pass, an identification card, an access pass, a keycard, a nametag, and a driver's license, an identification item, or a fixed-mount device depending on the particular application and/or location within an industrial automation environment. The RFID tag 102 can be utilized to identify a location associated therewith based at least in part upon the signal communicated between the RFID tag 102 and the RFID component 104. Moreover, the RFID tag 102 can be utilized to provide access codes and/or entry into a particular location, zone, and/or area.

It is to be appreciated that the RFID tag 102 can include any suitable data associated with, but not limited to, identification, location, biometrics, access, security, personal data, emergency contacts, automation environment, etc. This suitable data included with the RFID tag 102 can be utilized by the safety component 106 to incorporate security measures such as the protected zone 108 that can be in proximity to the device 110, wherein the protected zone 108 can be established by implementing a safe mode for the device 110. The safe mode (discussed infra) can be any suitable operation such that the device 110 can be deemed non-hazardous and/or safe. For example, a robot safe mode can be a slower speed in comparison to normal operation speed to prevent unpredictable and/or unavoidable movements. Although depicted within the protected zone 108, it is to be understood that the RFID component 104 and/or the safety component 106 can be within the protected zone 108, outside the protected zone 108, and/or any combination thereof. Moreover, the RFID component 104 can be utilized in conjunction with a separate sensor (not shown) such as, but not limited to, a safety curtain, a safety mat, etc.

In one example, a safety system can include various RFID identification badges and/or passes such that each pass or badge utilizes an RFID tag 102 with unique identification data. By employing RFID technology, the location of each badge and/or pass can be ascertained and, in turn, the location of any individual wearing and/or utilizing a badge or pass can be identified. Thus, when the badge and/or pass establishes communication or is within a pre-defined range of an RFID component 104, an unsafe and/or hazardous area, zone, and/or location, a safe mode can be initiated. For instance, when a person utilizing the badge comes into a room with various hazardous devices, the room and/or the devices located within can be forced into a safe mode such that the room and/or proximity related to the devices and/or room can be deemed a protected zone 108.

In addition, the RFID passes and/or badges can include a hierarchy of security rights and/or privileges such that particular locations within an industrial automation environment can be entered or denied based on such privileges and/or security rights. Thus, the RFID passes and/or badges can be employed to provide automatic access and/or automatically deny access to various locations, rooms, areas, zones, plants, factories, etc. Moreover, the RFID passes and/or badges can ensure the appropriate person is accessing and/or is denied access to a location by utilizing various authentication measures and/or biometric data within the badge and/or pass.

Furthermore, each RFID pass and/or badge identification and/or use can be verified, tracked, stored, etc. Thus, person A can access room X with a dangerous device Y for 10 minutes and then proceed down a hall to a break room for 45 minutes, wherein the system 100 can trace the location of person A, allow access to room X, force the device Y into the safe mode for 10 minutes, and then into normal operation (upon exit of proximity), log data associated to the location of person A, etc. It is to be appreciated that any number of badges and/or passes can be utilized and the claimed subject matter is not limited to the examples and/or figures depicting a single RFID tag, badge, and/or pass.

Figure 2:
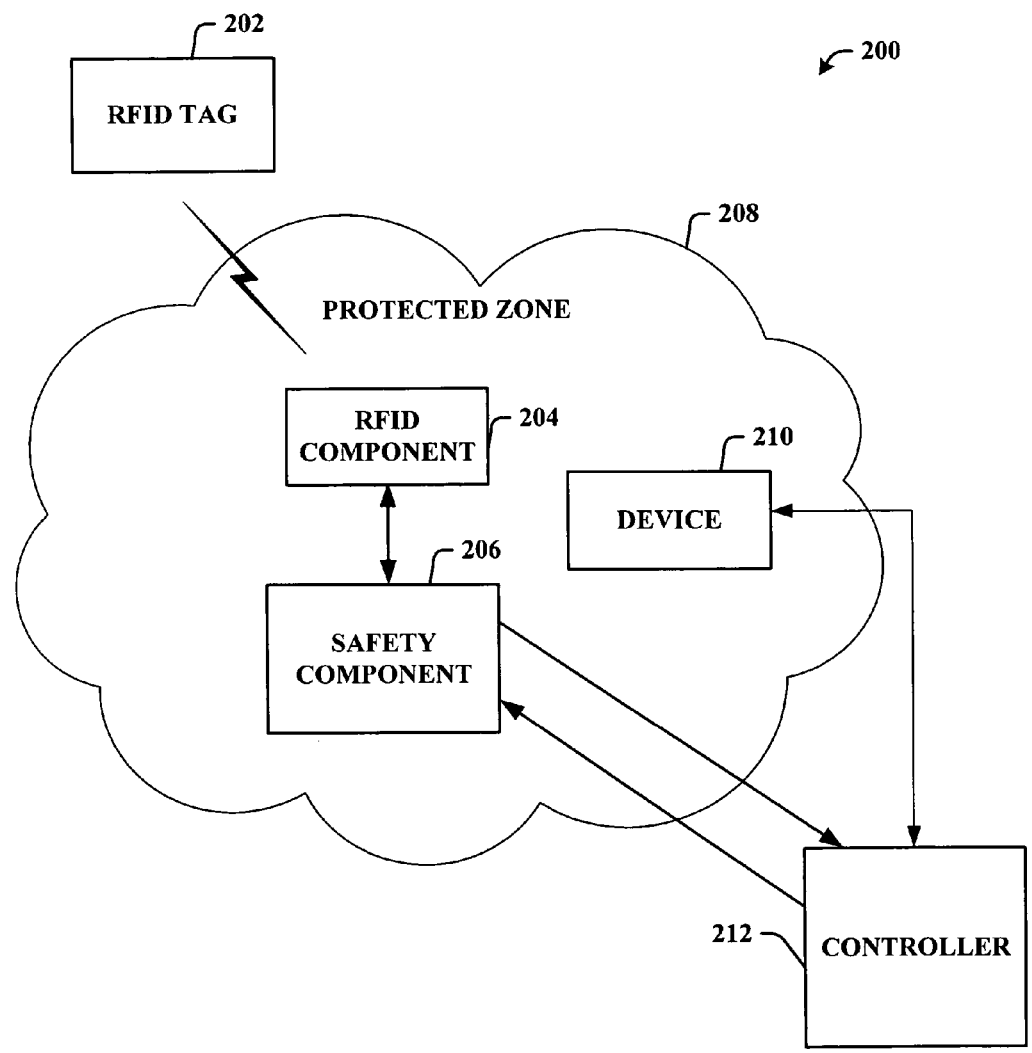
FIG. 2 illustrates a block diagram of an exemplary system that facilitates implementing a protected zone in proximity to a device to provide an additional safety mechanism.

FIG. 2 illustrates a system 200 that facilitates implementing a protected zone in proximity to a device to provide an additional safety mechanism. An RFID tag 202 can provide data to an RFID component 204 via wireless communication, wherein a safety component 206 can institute a protected zone 208 that invokes a safe mode to a device 210. The safety component 206 can determine and/or ascertain a location associated with the RFID tag 202 based at least in part upon the data wirelessly communicated. When the RFID tag 202 establishes communication within a particular range, the safety component 206 can employ a safe mode operation for the device 210 to allow for the protected zone 208 such that the protected zone 208 ensures safety and/or non-hazardous conditions therein. Moreover, the RFID tag 202 can be utilized to provide (via wireless communication) access codes and/or entry into a particular location, zone, and/or area. Although a single RFID tag 202 and a single RFID component 204 are depicted, it is to be understood and appreciated that any number of RFID tags and any number of RFID components can be utilized with the subject innovation. Moreover, the safe mode operation can be implemented to a plurality of devices.

The device 210 can include any suitable device within an industrial automation environment that can pose a threat, danger, and/or hazardous condition. For example, the device 210 can be, but is not limited to, a blade, a door, a press, a robot, welder, a machine, a roller, a welder, a laser, a scanner, a belt conveyor, a pump, a press, a fan, a fly-wheel, a movable machine part, a vent for harmful fumes, a drain for harmful material, a heat source, a cold source, a container with a material (e.g., safe mode allows material to be maintained at a safe level), an electrical source, etc. Furthermore, the device 210 can be controlled by a controller 212. It is to be appreciated that the controller 212 can contain software components and hardware components having inputs and/or outputs that can be utilized in connection with automating an industrial manufacturing device/process. Furthermore, the controller 212 can employ a safe mode to the device 210 based at least in part upon the RFID tag 202 communicating data within a given range and/or proximity to the RFID component 204. It is to be appreciated that the controller 212, the safety component 206, and the RFID component 204 can be within the protected zone 208, outside the boundaries of the protected zone 208, and/or any combination thereof.

The safety component 206 can invoke a safe mode via the controller 212 to provide a protected zone 208 that correlates to the location of the device 210. The safety component 206 can implement the safety mechanism based at least in part upon the RFID tag 202 and respective location. In addition, the safety component 206 can invoke a limit (e.g., torque, speed, position, temperature, etc.) on a device that can manage and/or control a hazard. For instance, when the RFID tag 202 is within a pre-defined region and/or area in proximity to the device 210, the protected zone 208 can be implemented by inducing a safe mode to the device 210 via at least one of the controller 212 and/or the safety component 206. In another example, the safety component 206 can allow access and/or entry into a particular location based at least in part upon the applicable access data is transmitted from the RFID tag 202. In an example, the safety component 206 can determine and/or ascertain a location associated with the RFID tag 202 based on the wireless communicated data received by the RFID component 204. Moreover, the safety component 206 can compare the location of the RFID tag 202 to a pre-defined region and/or area associated with the device 210. It is to be appreciated that the pre-defined region can be manually entered, automatically obtained, otherwise taught or learned by the system, and/or any combination thereof. In general, the pre-defined region can be any area associated with the device 210 that could harm and/or hurt an individual that is within such area. Moreover, the protected zone 208 can be an area that ensures safety and distance from harm's way. In other words, the pre-defined range can be a proximity that ensures danger if within, and the protected zone 208 can be a proximity that ensures safety if within. Yet, it is to be appreciated and understood that the pre-defined range and the protected zone 208 need not be equivalent.

For instance, a drill press can be automatically controlled by a controller, PLC, and/or a PC, wherein the operation of the drill press can be fatal and/or harmful to a person if within a proximity of 2 feet. Conventionally, any worker, visitor, inspector, etc. would completely cut power of to the drill press in order to ensure protection and/or safety when close to the drill press. However, by utilizing the RFID tag 202 to determine the location of an individual, the RFID component 204 can wirelessly receive location data associated thereto. Moreover, the safety component 206 can ascertain whether the location is within a pre-defined range that may be hazardous. Once within the range of danger, the drill press can be forced into a safe mode (e.g., powered down, slowed operation, no movement, a safety shutdown, a non-normal operation mode, a normal operation mode, a stepping mode, ceased drilling, etc.) to ensure a protected zone 208 in proximity to the drill press. For instance, the protected zone could be the entire room the drill press is located and the pre-defined range is the parameter of the room. In another example, the protected zone could be 5 feet surrounding the drill press and the pre-defined range is 3 feet surrounding the drill press (e.g., since the harmful radius is 2 feet). It is to be appreciated that the above is just one example and the subject innovation is not so limited.

Figure 3:
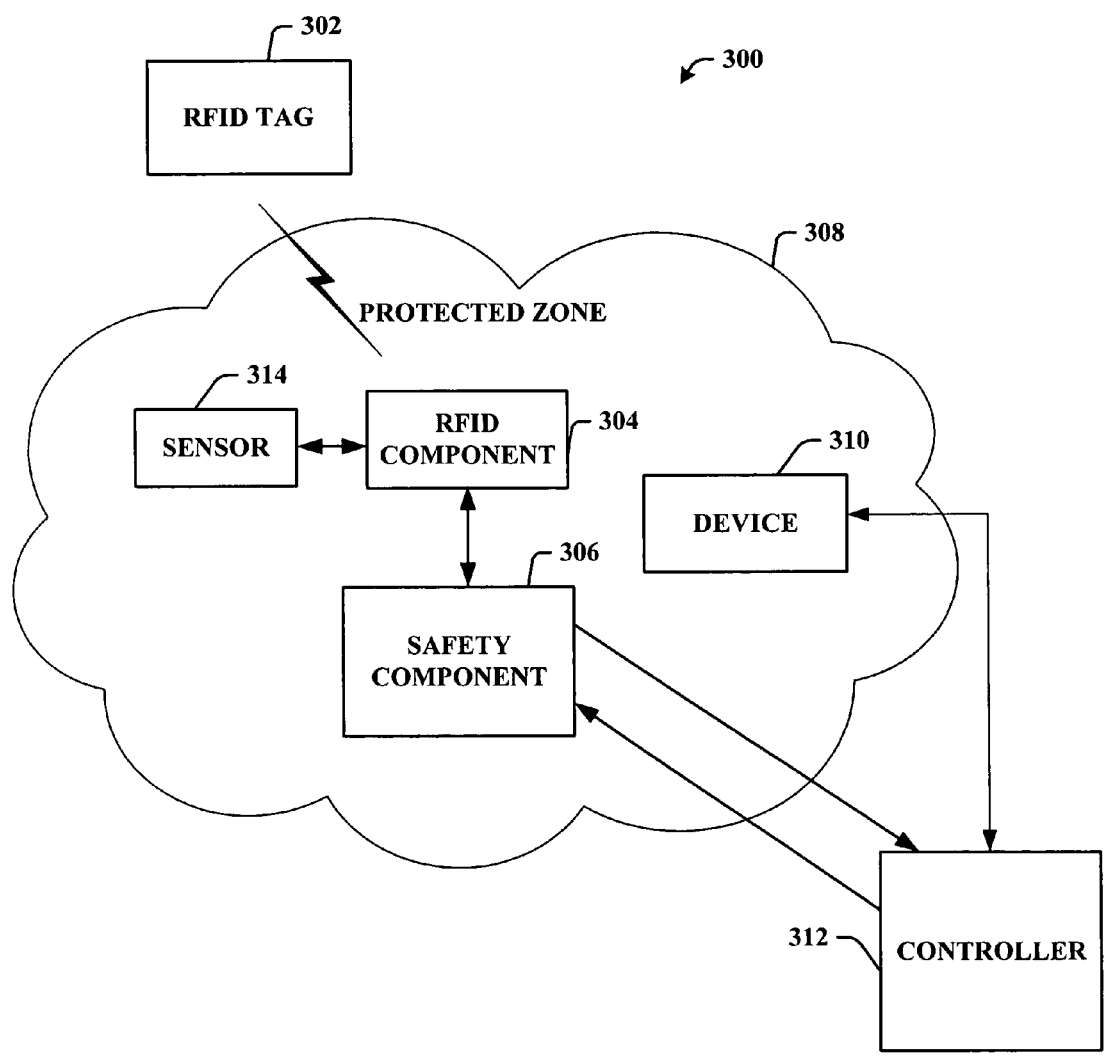
FIG. 3 illustrates a block diagram of an exemplary system that facilitates employing a safety measure that utilizes a protective zone that is within a proximity to a device.

FIG. 3 illustrates a system 300 that facilitates employing a safety measure that utilizes a protective zone that is within a proximity to a device. One or more RFID tags 302 can wireless transmit data related to a location, wherein an RFID component 304 can receive such data. It is to be appreciated that the RFID component 304 can be, but is not limited to, various components that read, write, receive, and/or store electronic product data, such as, readers, writers and/or servers, and can be a handheld device, incorporated into a device, a badge, an identification item, or a fixed-mount device depending on the particular application and/or location within an industrial automation environment. The location data can be utilized by a safety component 306 to employ and/or invoke a protected zone 308, wherein the protected zone 308 is created by implementing a safe mode on at least one device 310. Moreover, the RFID tag 302 can be utilized to provide access codes and/or entry into a particular location, zone, and/or area. A controller 312 can control the device 310 based at least in part upon a particular process and/or application. The safety component 306 can ascertain whether the location of the RFID tag 302 is within a dangerous area and/or zone and whether to invoke the safe mode to provide a safe area. It is to be appreciated that the RFID tag 302, the RFID component 304, the safety component 306, the device 310, and the controller 312 can be substantially similar to components, tags, devices, and controllers described in previous figures.

The system 300 can further utilize a sensor 314 in conjunction with the RFID tag 302 and the RFID component 304 to aid in invoking the safe mode to the device 310 and providing the protected zone 308. The sensor 314 can be any suitable sensor utilized within the automation industry such as, but not limited to, an optical sensor, a motion sensor, a safety mat, area scanners, a light curtain, etc. For example, an individual can be located with an identification badge including an RFID tag 302 when the sensor 314 is activated allowing the RFID component 304 to induce wireless transmission to identify location. Upon such location identification, the safety component 306 can provide the protected zone 308 by invoking a safe mode to the device 310. Although a single sensor 314 is depicted in FIG. 3, it is to be appreciated that a plurality of sensors can be utilized with the claimed subject matter. Moreover, it is to be appreciated that the sensors can be hard-wired, wireless, and/or any suitable sensor device within an industrial automation environment. For example, the sensor can be a finger print scanner that is on an authentication device outside an entrance to a safety zone.

One exemplary sensor is a safety mat, which is employed to detect a weight upon such mat. For instance, while an operator is standing upon the safety mat, it can be assured that the operator is not in danger with respect to operating machinery and/or the device 310. If the individual leaves the mat while a machine is operating, however, the individual's safety may be compromised and operation of the machinery and/or device 310 can be suspended until the individual returns to the safety mat, at which time the individual can manually restart the machinery and/or the machinery can automatically restart.

Another example of a sensor 314 utilized with the subject innovation is a safety light curtain. Safety light curtains are utilized to ensure that objects of threshold sizes do not come within a certain distance of particular portions of machinery. More specifically, a plurality of light emitters are aligned with a plurality of light detectors such that multiple beams of light are emitted in parallel to one another by the emitters and received by respective detectors. The detectors can be coupled to a device that is employed in connection with analyzing the light signals (the beams of light). In a detailed example, the detectors can be communicatively coupled to a shift register, and contents of the shift register can be analyzed in sequence by a microprocessor (e.g., a personal computer (PC), PLC, controller, etc.), which determines status of each light beam (e.g., whether a certain light beam is impeded).

If, upon analyzing the shift register, a determination is made that one or more beams of light has been impeded (such that light emitted from an emitter does not reach a corresponding detector), a microcontroller can communicate with output devices that are coupled to a controlling element to shut down a machine and/or device 310 associated with the safety light curtain. Thereafter the machine and/or device 310 can be manually restarted upon the beams being unimpeded. As can be surmised from the above, safety light curtains have saved numerous individuals from serious injury as well as increased useful life of machines and/or devices 310 (by protecting such machines from foreign objects in sensitive areas).

Figure 4:
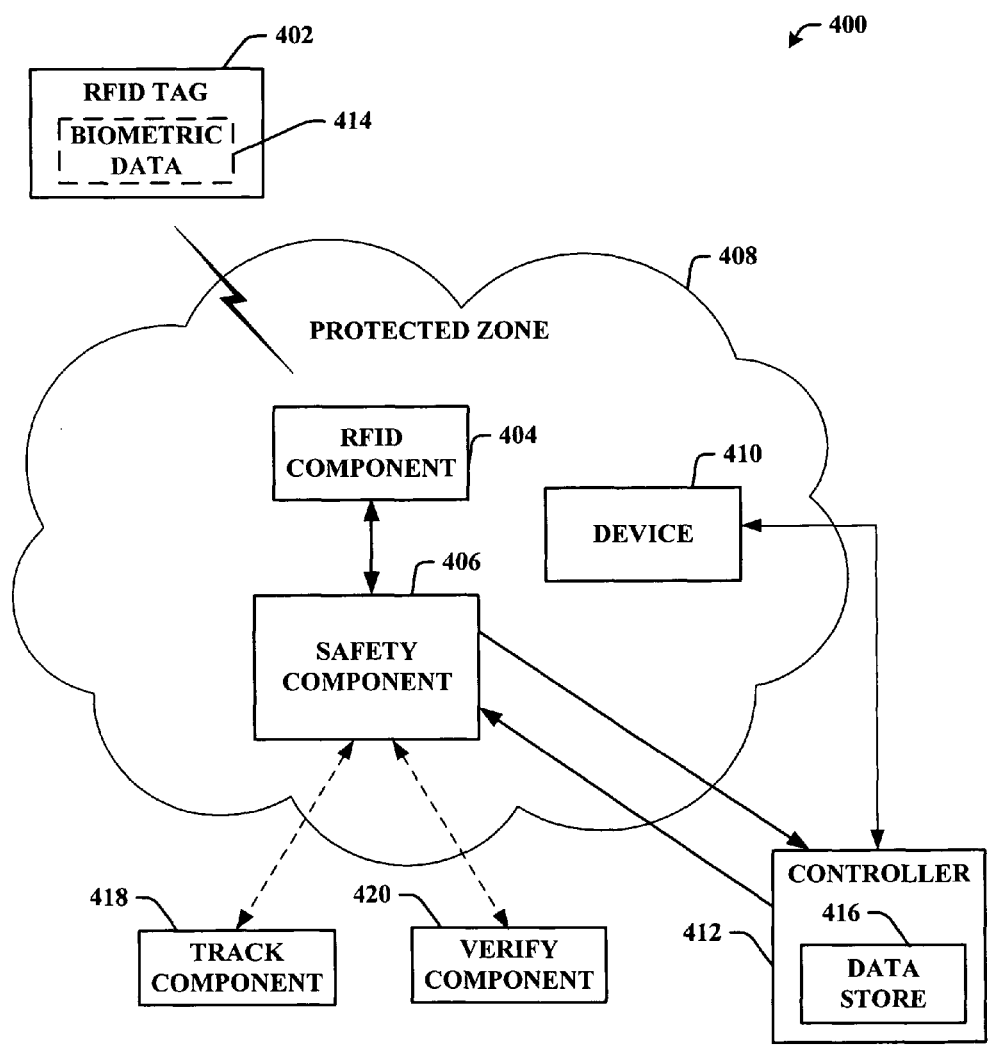
FIG. 4 illustrates a block diagram of an exemplary system that facilitates utilizing a safety mechanism that establishes a protective zone and/or area.

FIG. 4 illustrates a system 400 that facilitates utilizing a safety mechanism that establishes a protective zone and/or area. A safety component 406 can employ a protected zone 408 by implementing a safe mode to a device 410 based at least in part upon a location of an RFID tag 402, wherein such RFID tag data is wirelessly communicated to an RFID component 404. The safety component 406 can determine and/or ascertain the location of the RFID tag 402 and invoke a safe mode to a device 410 (e.g., controlled by a controller 412) based at least in part upon a pre-defined range and/or distance (e.g., related to the precautionary and/or safe range for an individual to be around). It is to be appreciated that the components, devices, and/or controllers can be substantially similar to components, devices, and/or controllers described in previous figures. Moreover, although a single RFID tag 402, a single controller 412, a single RFID component 404, a single zone, and a single device 410 are illustrated, it is to be understood that a plurality of tags, devices, controllers, components and zones can be utilized.

The RFID tag 402 can further include biometric data 414, wherein the biometric data 414 facilitates identification. For instance, a badge and/or pass can be utilized by an individual such that the badge and/or pass further include individual specific biometric data for verification and/or security purposes. In one example, the biometric data can include, but is not limited to, inductance, retina data, iris data, facial patterns, hand measurements, fingerprint, any other suitable biometric indicia, voice recognition, etc. In other words, the RFID tag 402 with biometric data 414 can provide automatic access, levels, privileges, and/or manipulation in process based at least in part upon the RFID tag 402 and/or biometric data 414 (e.g., upon verification and authentication). For example, the biometric data 414 can be transmitted along with the location data and/or coded access data.

The device 410 can be manipulated and/or controlled by the controller 412. It is to be appreciated that the controller 412 can include software and/or hardware components, wherein inputs and/or outputs can be utilized in order to automate an industrial device and/or process. Furthermore, the controller 412 can include an internal data store 416 that facilitates storing and/or accessing data to achieve efficiency and speed. With the controller 412 having the internal data store 416, standardization and functionality can be enabled in the manufacturing process and/or automation system.

The internal data store 416 can utilize common data store technology for representing, configuring, editing, entering, and communicating the data contained therein. It is to be appreciated and understood that the internal data store 416 can include object oriented methods for structuring data and methods that can be operated on such data. By creating the association of data record types to each other and to functions or business rules that could be programmed on the controller 412, the controller 412 and associated device 410 can accomplish a plurality of jobs beyond conventional system program logic controller (PLC) based automation devices.

In addition, utilizing the internal data store 416 within the controller 412, the control programming can take advantage of direct access to the stored information for driving decisions, operations, mechanisms, manipulations, and controlling devices. By providing an on-board data store such as the data store 416, the time and/or number of steps required to execute the desired automation functions is greatly reduced. Local automation programming can also advantageously utilize inherent information manipulation capabilities of such system 400 to directly access the data in a form and format more consistent with business data access (e.g., including structured and/or object oriented data representation and addressing).

The data store 416 can store various data related to the system 400, such as, but not limited to, biometric data, access data, security data, historical data (e.g., based on access levels, tracking data, verification data, locations visited, access times, tracking information, etc.), usernames, passwords, pre-defined safety ranges, safe mode operations, device listings, controller listings, RFID tag listings, RFID component listings, etc. The data store 416 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 416 of the subject systems and methods is intended to comprise, without being limited to, these and any other suitable types of memory. In addition, it is to be appreciated that the data store 416 can be a server, a database, a hard drive, and the like.

The system 400 can further include a track component 418 that can track the location and/or proximity of the RFID tag 402. The track component 418 can utilize any wirelessly communicated data to locate the RFID tag 402 to allow for tracking of such individual and/or item utilizing the RFID tag 402. Furthermore, the track component 418 can utilize the data store 416 to store the tracking data. For instance, the track component 418 can provide real-time data associated to the location of the RFID tag 402. Moreover, any historic data can be logged and/or stored to allow the previous locations of the RFID tag 402 to be examined, utilized, etc. It is to be appreciated that the track component 418 can be a stand-alone component, incorporated into the protected zone 408, incorporated into the safety component 406, and/or any combination thereof.

The system 400 can further utilize a verify component 420 to employ verification techniques to ensure integrity of the system 400, correct badge, pass, and/or RFID tag and individual association, etc. The verify component 420 can utilize any suitable verification technique such as comparison of RFID tag data 402 and/or biometric data 414 to tables and/or data including access codes, security codes, privileges, biometric data, etc. It is to be appreciated that the verify component 420 can be a stand-alone component, incorporated into the protected zone 408, incorporated into the safety component 406, and/or any combination thereof.

The following examples can be implemented by the system 400 and are not to be limiting on the claimed subject matter. The system 400 can invoke at least the following access possibilities: 1) RFID reader (tagged with badge) that includes information to allow for various levels of access into a protected area; 2) biometric data to be utilized in conjunction with access protection to ensure that the right person is using the correct badge and/or pass; and 3) tracking of the RFID tag within the protected zone. The active RFID component 404 (e.g., RFID reader sensor and/or subsystem) can be incorporated into a product. Moreover, the active RFID component 404 can be a stand-alone device or technology that can be incorporated into other access devices such as, but not limited to, light curtains, safety mats, area scanners, etc. The active RFID data can include access codes that can be transmitted when activated by an RFID component 404 (e.g., an RFID scanner) located near an area entrance, gate, door, region, etc.

In one example, the RFID tag 402 can be utilized into an intelligent badge and/or pass. The intelligent badge and/or pass can read specific biometric parameters associated with an individual. Moreover, the biometric information can be transmitted along with the coded access data to the RFID component 404. Subsequently, the RFID component 404 can then relay the data and/or information to the controller 416 and/or other entity to confirm access.

Upon authentication of the badge, access can be triggered. Take for example, the following scenario: when a human enters the protected zone via an access gate, 1) the badge sensor can read access information off of the badge and relay such information to the controller; 2) the controller can authenticate the badge, if the correct access is provided, then process continues and the controller sets "info" to state that someone has entered the protected zone and the controller can trigger safe state based on safety routine; if the incorrect access is provided, process can stop as per safety control procedure (it is to be appreciated that if a human enters the zone without a badge (e.g., triggering a sensor), than the safety system can be invoked); 3) when a human leaves the protected zone via an access gate, the badge sensor can read access information from the badge, relay such information to the controller, have the controller check to see if the person is entering or leaving (if leaving, the "info" can be cleared in the controller data).

The subject innovation can provide access trigger plus access level authentication and/or change in control process. It is to be appreciated that multiple levels of access can be utilized such as, but not limited to, maintenance, supervisory, engineer, low level, high level, management, union, etc. The above scenario can be applied with controller changing safety routines based on change in access levels. For instance, assuming the protected zone is active, if a human enters the zone with a maintenance access, than controller can set a device (e.g., robot, etc.) to safe speeds to prevent danger to the human. When the human then leaves the zone, normal process can be resumed. If the RFID tag 402 further utilizes biometric data 414, the following can be implemented: 1) biometric sensor can be contained in badge/pass and/or biometric sensor can be placed at an access point; and 2) if incorporated into the badge, biometric data along with access data can be transmitted to the RFID component 404 and then the above example scenario can be utilized.

It is to be appreciated that the claimed subject matter can employ the following: when entering a zone, the RFID component 404 can read first and then access sensor (e.g., light curtains, etc.) can be tripped, if no trip occurs within "x" seconds, the system can go into a safe state; when leaving a protected zone, the reader can read first and then the zone access can be tripped, if no trip occurs within "x" seconds, then the controller can consider that a human is still in the protected zone. Moreover, it is to be appreciated that if the trip does not occur within "x" seconds, then the access can revert back (e.g., if someone decides they can enter after "x" seconds, then a trip can cause a safe state). In addition, it is to be appreciated and understood that the above example can be utilized for when an individual is leaving the protected zone. In another example, where a controller understands the number of people in a protected zone, any entry/exit sensor can be tripped but the sequence of the RFID tag is read is critical.

Figure 5:
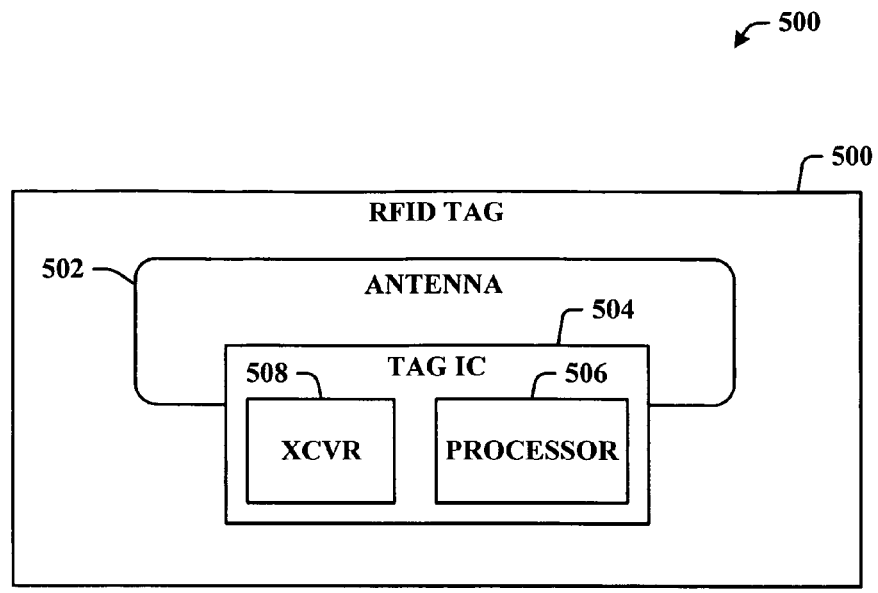
FIG. 5 illustrates an RFID tag in accordance with the claimed subject matter.

FIG. 5 illustrates an RFID tag 500 in accordance with the claimed subject matter. It is to be appreciated and understood that the tag 500 can be a passive RFID tag, and in particular a passive UHF tag. The tag 500 can include a single antenna 502 (or multiple antennas) (denoted ANTENNA) that facilitates communicating signals and data with an RFID reader (or reader/writer) (not shown). The tag 500 also includes a tag IC 504 that provides onboard processing of the data and signals. In support thereof, the tag IC 504 further includes a processor 506 (e.g., a digital signal processor-DSP) that facilitates data and signal processing and storage, and a transceiver 508 that interfaces to the antenna 502 for communications of the data and signals. It is to be appreciated that the tag 500 can be a passive tag (e.g., no internal power supply) and/or an active tag, such that a power source (not shown) (e.g., a coin cell, capacitor) is provided.

Figure 6:
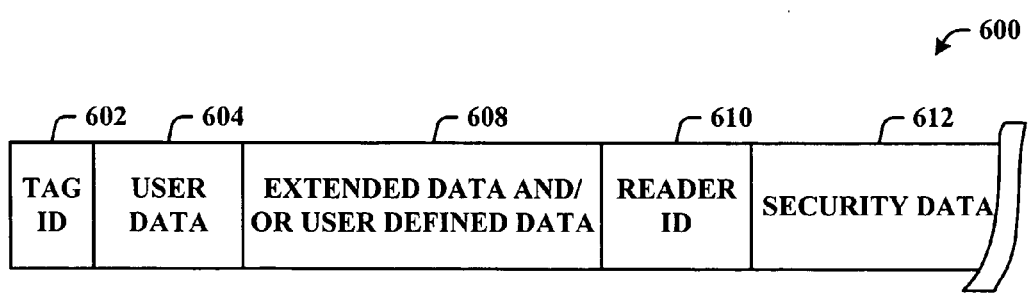
FIG. 6 illustrates an exemplary RFID data packet that includes identification and/or location data which can be utilized to provide a safety mechanism within a protected zone.

FIG. 6 illustrates an exemplary RFID data packet 600 that includes identification and/or location data which can be utilized to provide a safety mechanism within a protected zone. It is to be appreciated that the RFID data packet 600 is depicted as an example and the order of the data in the packet is not to be limiting on the subject innovation. The safety mechanism can be, for example, access and/or a safe mode to provide a protected zone. The RFID data packet 600 can be related to a passive RFID tag, and in particular a passive UHF tag. The packet 600 can include a tag ID 602 that uniquely identifies the tag; however, this is not a requirement. User data 604 is included that describes the user and/or badge/pass to which the RFID tag is attached or associated. The packet 600 also includes extended data and/or user defined data 608. The extended data and/or user defined data 608 can be utilized to encode information that can be utilized by a safety component, controller, and/or device to provide at least one of an access and/or a safety mechanism. For example, the extended data and/or user defined data 608 can be related to access level, plant and/or factory geographic area, contact information (e.g., email, emergency contact info, cellular phone number, address, etc.), company information, position and/or title information, etc. Reader ID data 610 can be received from the reader from which the generated frequency can be known to verify tag and/or reader capability. Security data 612 can also be communicated, since the tag IC can interface to one or more sensors (e.g., optical, safety mats, light curtains, area sensors, . . . ) to provide access rights, level of security, etc. Other data can also be communicated via the packet 600, according to the particular application, process, device, and/or security mechanism implemented.

Figure 7:
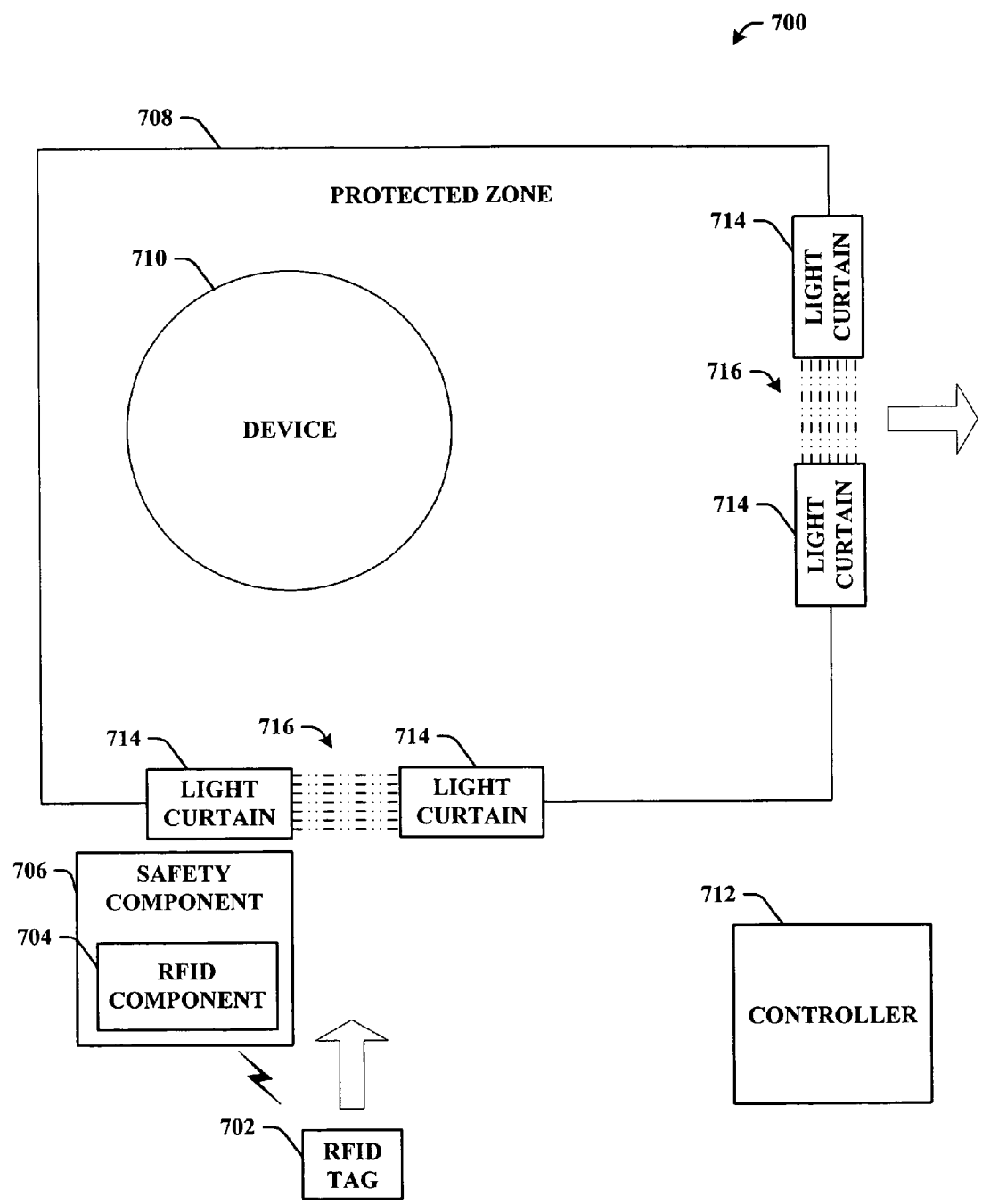
FIG. 7 illustrates an application of an RFID area protection system in accordance with at least one aspect of the claimed subject matter.

FIG. 7 illustrates an application of an RFID area protection system 700 in accordance with at least one aspect of the claimed subject matter. An RFID tag 702 can be incorporated and/or embedded with a badge and/or pass associated with an industrial automation environment. The badge and/or pass can be utilized by an individual, wherein entry to a protected zone 708 can be requested. It is to be appreciated that an arrow pointing toward the protected zone 708 indicates entry to such area and an arrow pointing from the protected zone 708 indicates exit to such area. Prior to entering, the RFID tag can be read via wirelessly transmitting any suitable RFID data. When the person enters the protected zone 708, a pair of light curtains 714 can be disrupted (e.g., light plane emitted 716 is broken). Upon disruption of the light curtain screen 716, standards can dictate the safe mode(s) that are employed. It is to be appreciated that for this particular example, a safety component 706 includes the RFID component 704 to depict a stand-alone system that can be additional to already established sensors.

If the RFID tag 702 does not include biometric data, then access request can be sent to a safety component 706 that can determine and/or ascertain location and/or access, wherein a controller 712 can implement a safety mechanism based at least in part upon such determination. If the RFID tag 702 includes biometric data, than access and user information can be tracked, stored, and/or cleared by the safety component 706 and/or the controller 712. If the RFID tag 702 data denies access, a safety shutdown can be initiated (e.g., individual does not have appropriate clearance to be within device 710 proximity because, for instance, no training on safety, unfamiliar with the device 710, etc.). If the access level is ok, then the process changes can be induced based on programming and/or pre-defined (e.g., a non-movement mode, a non-normal operation mode, a normal operation mode, a stepping mode, safe mode, shutdown, slow-down, different mode based on closeness to device 710, mode respective to solely access level, etc.).

Upon exit, a person can leave the protected zone. For instance, the exiting can be detected by breaking the light curtain screen 716 instantiated by the light curtain 714. It is to be appreciated that either on disrupting of the light curtain screen 716 and/or before entering into the protected zone 708, the RFID tag 702 on an individual can be wirelessly transmitted to the RFID component 704. After analysis by the safety component 706, the controller 712 can provide appropriate action and/or manipulation to the device 710. For instance, the controller 712 can restart, put the process back in normal operation, place device 710 in a safe mode, request a manual restart, safety shutdown for the device 710, etc. It is to be appreciated that the above example is not so limiting on the claimed subject matter and that if two or more RFID tags 702 are within the protected zone 708, the example can be different and/or manipulated.

Figure 8:
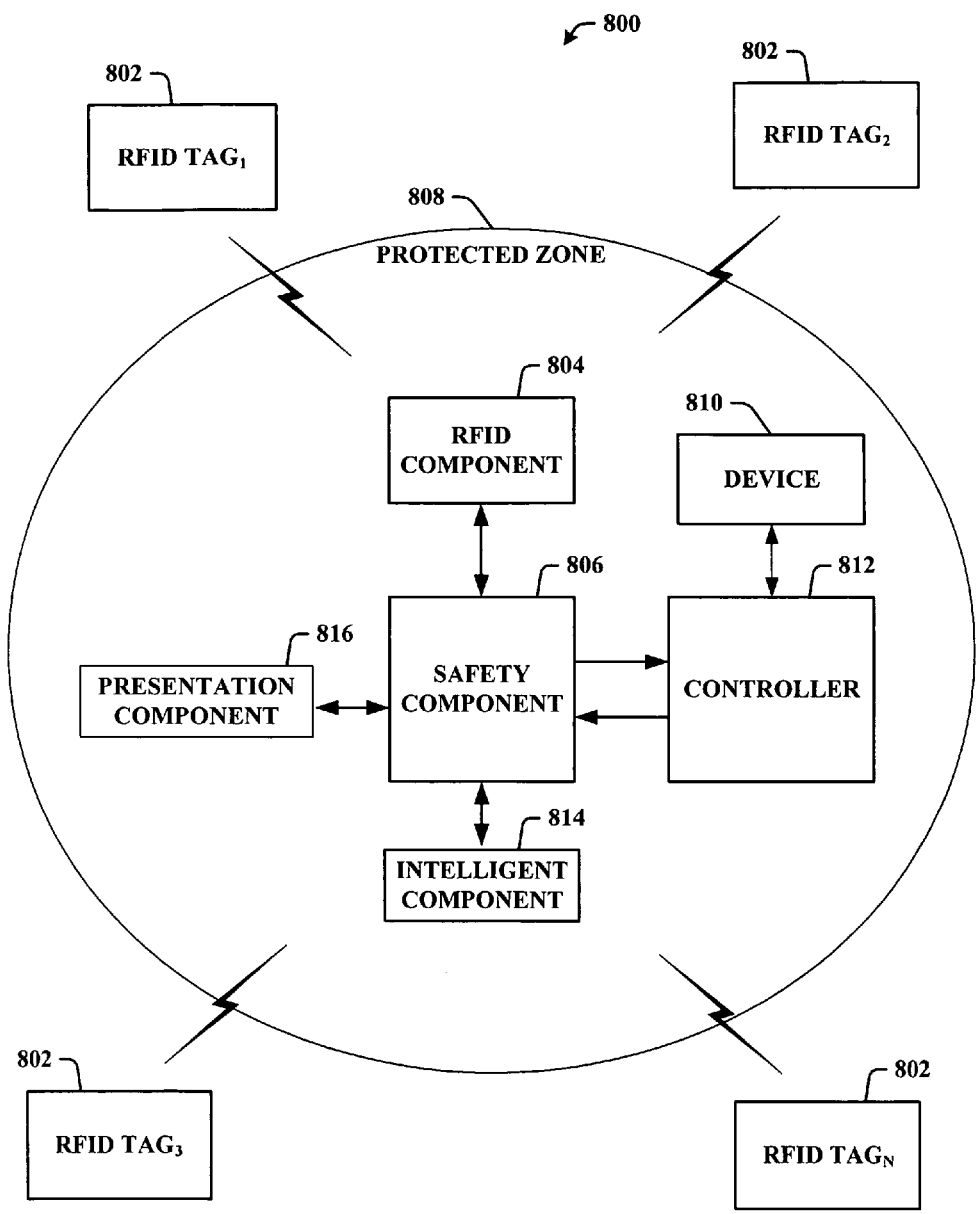
FIG. 8 illustrates a block diagram of an exemplary system that facilitates employing a safety mechanism that establishes a protective zone and/or area.

FIG. 8 illustrates a system 800 that facilitates employing a safety mechanism that provides access and/or establishes a protective zone and/or area. The system 800 can employ intelligence to facilitate utilizing RFID tag data to manipulate a device. The manipulation of the device can be, for instance, invoking a safe mode to the device, allowing access to the device, and/or controlling the device and/or process related to the device. The system 800 can include an RFID tag 802, an RFID component 804, a device 810, a safety component 806, and a controller 812 that can all be substantially similar to respective components, devices, controllers, and tags described in previous figures. Moreover, it is to be appreciated that there can be any number of RFID tags 802 as indicated by RFID tag 1, RFID tag 2, RFID tag 3, to RFID N, where N is an integer greater than or equal to 1.

The system 800 further includes an intelligent component 814. The intelligent component 814 can be utilized by the safety component 806 to facilitate employing a safe mode and/or provide access to the protected zone 808 and/or the device 810. For example, the intelligent component 814 can infer the safe mode for the device 810, the access to a particular location, the access level, pre-defined range and/or distance for safety, a protected zone, etc. It is to be appreciated that the intelligent component 814 can be a stand-alone component, incorporated into the safety component 806, and/or any combination thereof.

It is to be understood that the intelligent component 814 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 816 can provide various types of user interfaces to facilitate interaction between a user and any component associated with the system 800. As depicted, the presentation component 816 is a separate entity that can be utilized with the safety component 806. However, it is to be appreciated that the presentation component 816 and/or similar view components can be incorporated into the safety component 806 and/or a stand-alone unit. The presentation component 816 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the safety component 806.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 9:
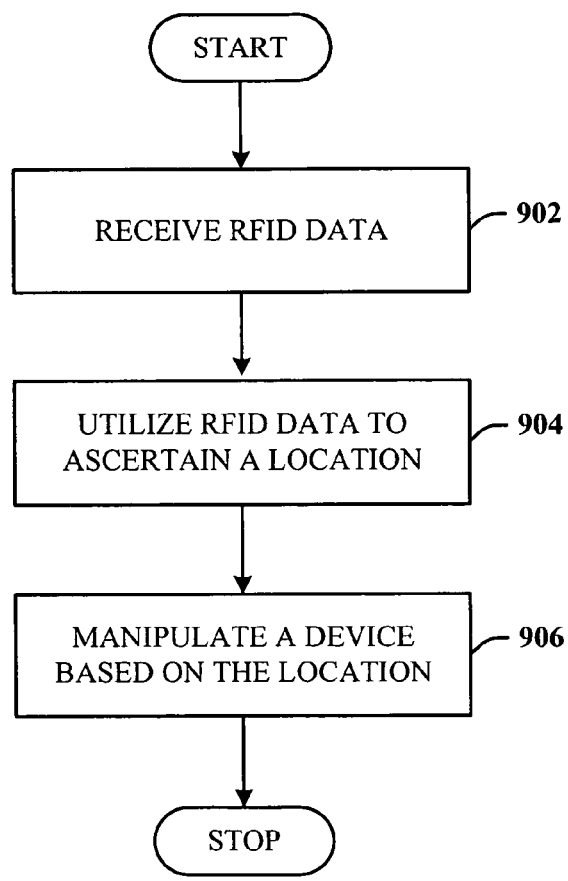
FIG. 9 illustrates a methodology that facilitates implementing a protected zone in proximity to a device to provide an additional safety mechanism.
Figure 10:
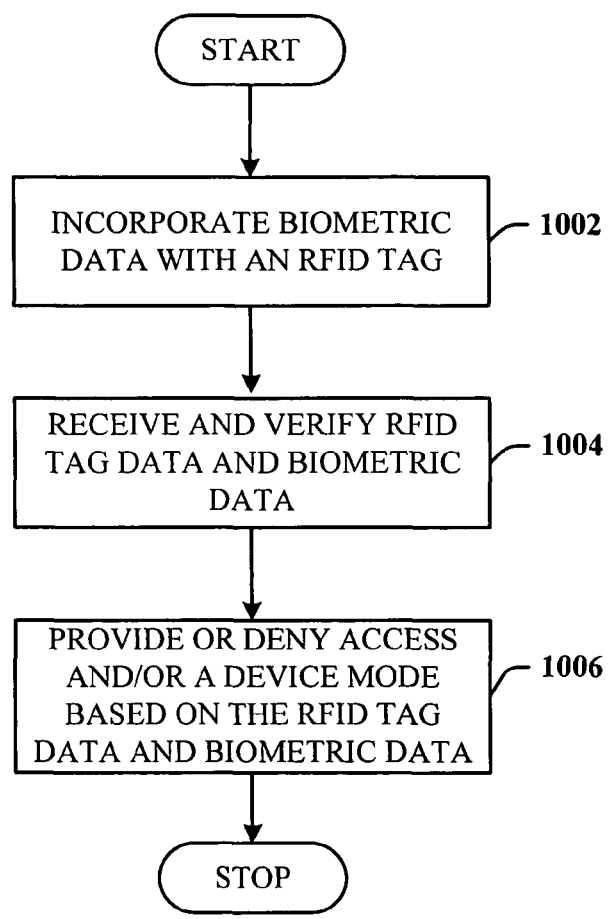
FIG. 10 illustrates a methodology that facilitates employing a safety measure that utilizes a protective zone that is within a proximity to a device.
Figure 11:
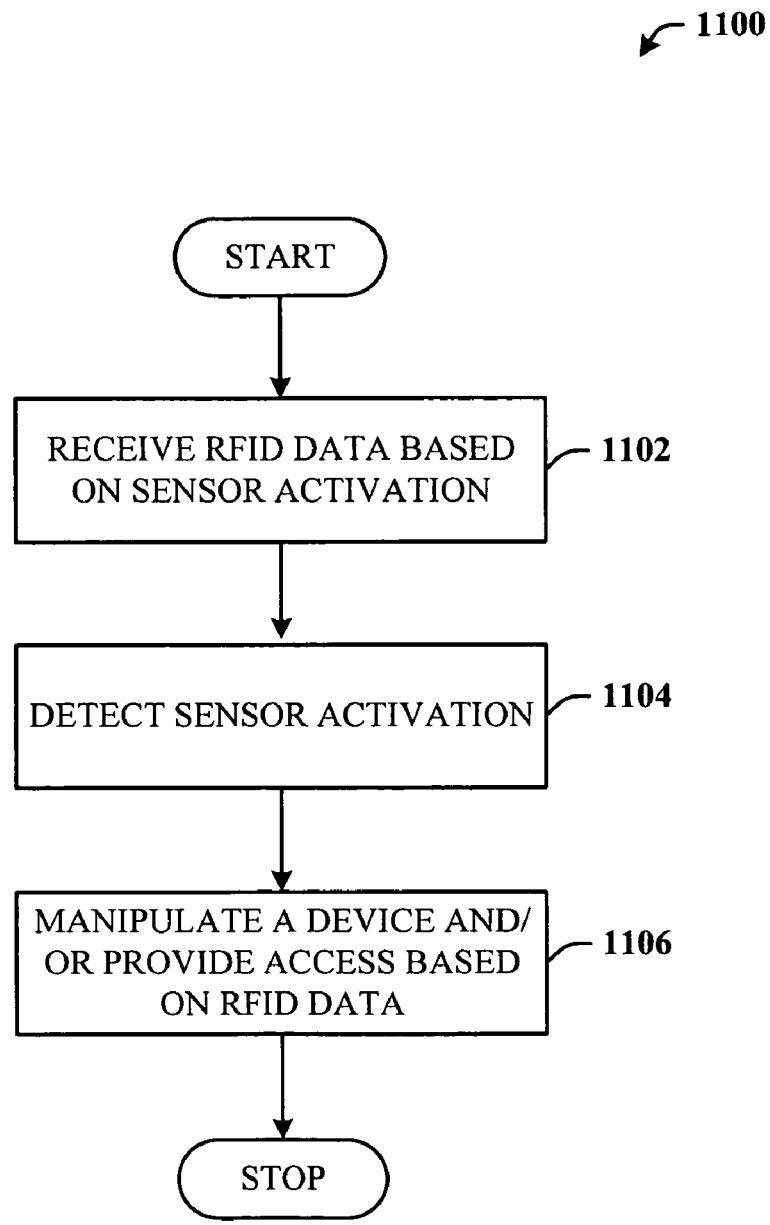
FIG. 11 illustrates a methodology for utilizing a safety mechanism that establishes a protective zone and/or area.

FIGS. 9-11 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 9 illustrates a methodology 900 for implementing a protected zone in proximity to a device to provide an additional safety mechanism. At reference numeral 902, RFID data can be received by the RFID component. The RFID component can be, but is not limited to, various components that read, write, receive, and/or store electronic product data, such as, readers, writers and/or servers, and can be a handheld device, incorporated into a device, a badge, an identification item, or a fixed-mount device depending on the particular application and/or location within an industrial automation environment. Moreover, the RFID component can be utilized in conjunction with a separate sensor (not shown) such as, but not limited to, a safety curtain, a safety mat, etc. It is to be appreciated and understood that the RFID tag can be a passive RFID tag, and in particular a passive UHF tag. Moreover, it is to be appreciated that the RFID tag can include any suitable data associated with, but not limited to, identification, location, biometrics, access, security, personal data, emergency contacts, automation environment, etc. At reference numeral 904, the RFID data can be utilized to ascertain a location. The location can be associated with a badge and/or pass used by an individual to provide a proximity and/or location within a designated area.

At reference numeral 906, a device can be manipulated based at least in part upon the location of the RFID tag. For instance, a protected zone can be invoked based on a predefined safety range that should be in effect when an individual is in proximity therewith. In another example, the protected zone can be invoked by forcing the device into a safe mode, a safety mode, a shutdown mode, a slow mode, etc. In other words, the protected zone can be employed by placing the device in a disparate operational mode other than a normal operational mode. The device can be, but is not limited to, any suitable device within an industrial automation environment that can pose a threat, danger, and/or hazardous condition. For example, the device can be, but is not limited to, a blade, a press, a door, a robot, welder, a machine, a roller, a welder, a laser, a scanner, a belt conveyor, a pump, a press, a fan, a fly-wheel, a movable machine part, a vent for harmful fumes, a drain for harmful material, a heat source, a cold source, a container with a material (e.g., safe mode allows material to be maintained at a safe level), an electrical source, etc.

FIG. 10 illustrates a methodology 1000 that facilitates employing a safety measure that utilizes a protective zone that is within a proximity to a device. At reference numeral 1102, biometric data can be incorporated and/or embedded with an RFID tag. For instance, the biometric data can be, but is not limited to, inductance, retina data, iris data, facial patterns, hand measurements, fingerprint, any other suitable biometric indicia, voice recognition, etc. At reference numeral 1004, the RFID tag data and the biometric data can be communicated wirelessly. For instance, the RFID tag data and/or biometric data can be received wirelessly via an RFID component as described above. Moreover, it is to be appreciated that the sensors can be hard-wired, wireless, and/or any suitable sensor device within an industrial automation environment. For example, the sensor can be a finger print scanner that is on an authentication device outside an entrance to a safety zone.

At reference numeral 1006, access can be denied, approved, and/or a device mode can be provided based at least in part upon RFID tag data and/or the biometric data. For instance, the biometric data can provide verification techniques in association with individuals and respective badges/passes. In another example, the access to a particular zone can be granted based on the RFID tag data. In yet another example, access can be granted to a particular zone and the operation mode of a device can be manipulated based at least in part upon the RFID tag data and/or biometric data. In still another example, the RFID tags can be utilized to provide tracking of the badge/pass and/or individual utilizing the RFID tag.

FIG. 11 illustrates a methodology 1100 for utilizing a safety mechanism that provides access and/or establishes a protective zone and/or area. At reference numeral 1102, RFID data can be received before entering into a protected zone. At reference numeral 1104, a sensor can be activated. For example, the activation of a safety mat can be an activation of a sensor. The sensor can be any suitable sensor utilized within the automation industry such as, but not limited to, an optical sensor, a motion sensor, a safety mat, area scanners, a light curtain, etc. At reference numeral 1106, a device can be manipulated and/or access can be provided based at least in part upon the wirelessly received RFID data. For example, a sensor can be activated, RFID data can be communicated and a device can be shutdown. In another example, a sensor can be activated upon exit of a protected zone, wherein the RFID data can be communicated and the device can be forced into normal operation. In another example, an individual can be located with an identification badge including an RFID tag when the sensor is activated allowing the RFID component to induce wireless transmission to identify location. Upon such location identification, a protected zone can be in effect by invoking a safe mode to the device.

Figure 12:
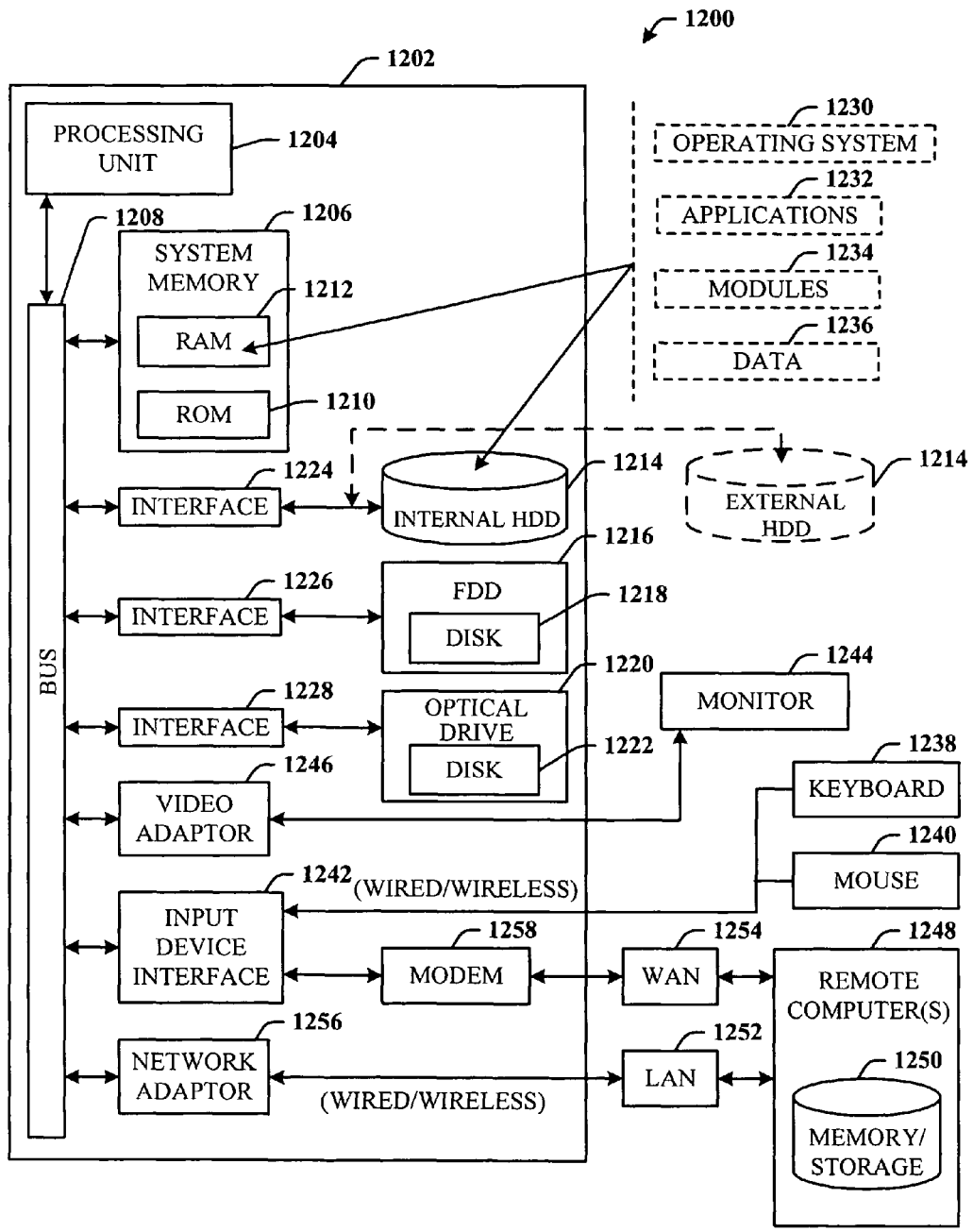
FIG. 12 illustrates a block diagram of a computer operable to execute the disclosed architecture.
Figure 13:
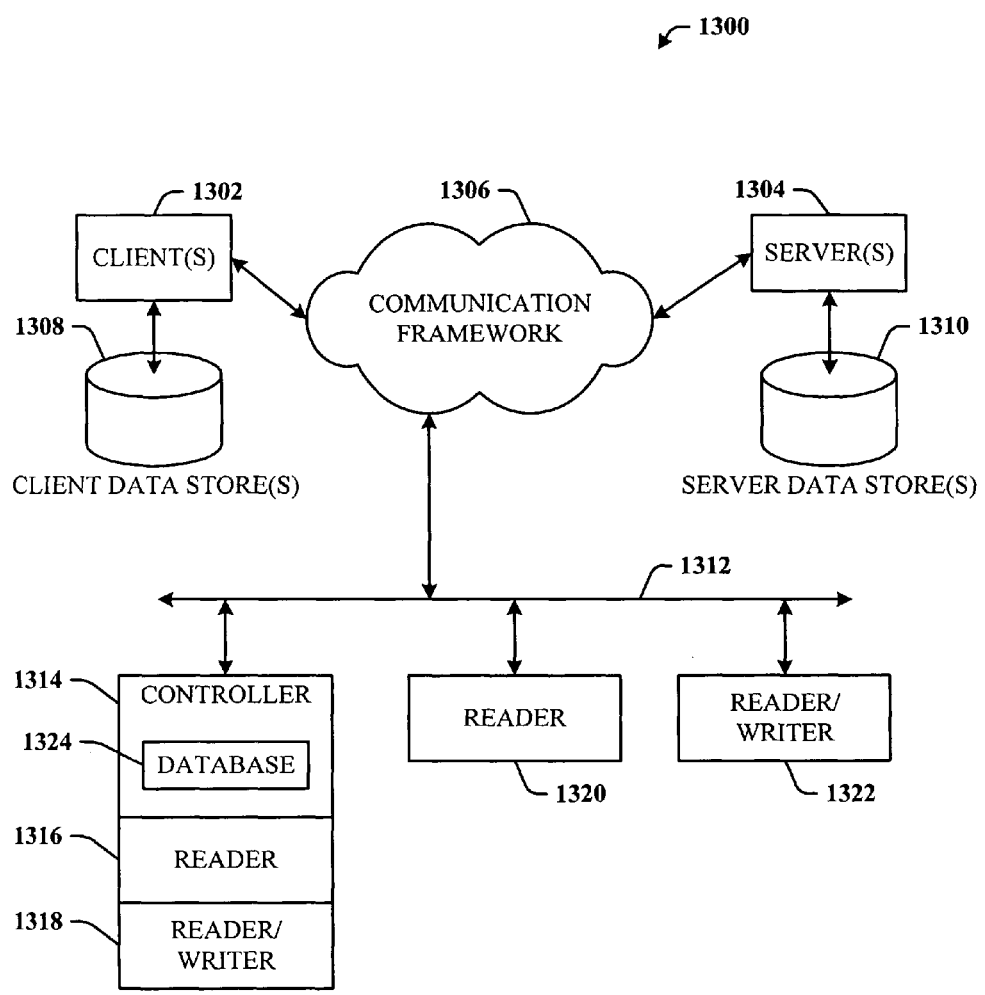
FIG. 13 illustrates a schematic block diagram of an exemplary computing environment in accordance with the claimed subject matter.

In order to provide additional context for implementing various aspects of the claimed subject matter, FIGS. 12-13 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216, and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1094 interface technologies. Other external drive connection technologies are within contemplation of the subject invention.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234, and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1094 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device, or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and BluetoothTm wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

The framework 1306 can also include a subnetwork 1312, for example, that can be implemented as in an assembly line environment. The subnetwork 1312 can have disposed thereon as nodes, a controller 1314 (e.g., a PLC) that controls a reader module 1316 and a reader/writer module 1318 both of which can read RFID tags, and the latter of which can write data to the RFID tags. The controller 1314 can include an internal database 1324 to store RFID tag data information as described above. The controller 1314, reader module 1316 and reader/writer module 1318 can be provided in a rack configuration at selected locations. Alternatively or in combination therewith, the subnetwork 1312 can also include a second reader module 1320 as a wired or wireless node (or client) that is positioned (fixed or mobile) to read RFD tags, as needed. Similarly, the subnetwork 1312 can also support a reader/writer module 1322 as a wired and/or wireless client node for reading and writing data and signals to RIFD tags that come within a coverage area.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates providing a safety mechanism, comprising:
    an radio frequency identification (RFID) component that receives data from an RFID tag identifying a location of the RFID tag and an access level associated with the RFID tag; and
    a safety component that initiates a safe mode in an industrial device based at least in part upon the access level and a proximity of the RFID tag to the industrial device as determined by the location, wherein the safe mode comprises a slowed operation mode wherein the device operates at a slower speed in comparison with normal operating speed if the access level allows access to the industrial device, and the safe mode comprises a stopped state if the access level denies access to the industrial device.

2. The system of claim 1, wherein the RFID component is at least one of an RFID reader, an RFID writer, or an RFID reader/writer.

3. The system of claim 1, wherein the industrial device is at least one of the following: a blade; a door; a robot; a machine; a roller; a welder; a laser; a scanner; a belt conveyor; a pump; a press; a fan; a fly-wheel; or a movable machine part.

4. The system of claim 1, wherein the RFID tag is a passive ultra high frequency (UHF) RFID tag.

5. The system of claim 4, wherein the RFID tag is associated with at least one of a badge, a pass, an identification card, an access pass, a keycard, a nametag, or a driver's license.

6. The system of claim 5, wherein the RFID tag includes biometric data that is at least one of an inductance, retina data, iris data, a facial pattern, a hand measurement, a fingerprint, or a voice pattern.

7. The system of claim 1, further comprising a controller that controls the industrial device based at least in part upon the safe mode implemented.

8. The system of claim 7, wherein the controller directly controls the industrial device based at least in part upon the data received from the RFID tag.

9. The system of claim 1, wherein the safety component initiates the safe mode upon determining that the RFID tag is within a pre-defined distance from the industrial device.

10. The system of claim 9, wherein the pre-defined distance is automatically defined based on a location of the industrial device.

11. The system of claim 1, wherein the safety component manipulates an industrial automation process associated with the industrial device based at least in part upon the data received from the RFID tag.

12. The system of claim 1, further comprising a sensor utilized in conjunction with the RFID tag that provides a signal initiating transmission of the data from the RFID tag upon detecting an entry into a protected zone.

13. The system of claim 12, wherein the sensor is at least one of an optical sensor, a motion sensor, a safety mat, an area scanner, or a light curtain.

14. The system of claim 12, wherein the sensor is associated with at least one of the RFID component, the safety component, or the industrial device.

15. The system of claim 1, wherein the RFID tag reads biometric parameters associated with an individual using the RFID tag.

16. The system of claim 15, further comprising a verify component that utilizes the biometric parameters read by the RFID tag and verifies that the RFID tag is being used by a correct individual.

17. The system of claim 1, further comprising a track component that tracks the RFID tag.

18. The system of claim 1, further comprising an intelligent component that employs a probabilistic or statistical-based analysis to infer at least one of an access, a denial, or the safety mode to be initiated by the safety component.

19. The system of claim 1, wherein the RFID tag includes at least one of a tag identification, user data, extended data, user defined data, reader identification, security data, location data, biometric data, access data, personal data, or automation environment data.

20. A method that facilitates invoking a safety mechanism within an industrial automation environment, comprising:
receiving a signal at a radio frequency identification (RFID) component from an RFID tag;
decoding and translating the signal to yield location information and access level information;
ascertaining from the location information a location associated with the RFID tag; and
if the location is determined to be within a predetermined distance from an industrial device associated with the safety mechanism:
initiating a slowed operation mode in the industrial device wherein the industrial device operates at a slower speed in comparison with normal operating speed if the access level information allows access to the industrial device; and
initiating a stopped state in the industrial device if the access level information denies access to the industrial device.

21. The method of claim 20, further comprising:
reading biometric parameters associated with an entity utilizing the RFID tag; and
verifying that the entity utilizing the RFID tag is correctly associated with the RFID tag using the biometric parameters.

22. The method of claim 20, further comprising:
initiating transmission of the signal from the RFID tag in response to an input from a sensor that detects a proximity to the industrial device; and
placing the industrial device in a stopped state if no RFID tag is detected after detecting the proximity to the industrial device.

23. The method of claim 20, further comprising tracking the RFID tag within the industrial automation environment.

24. The method of claim 20, further comprising:
utilizing biometric data stored within the RFID tag to determine an allowed level of access; and
manipulating an industrial automation process related to the industrial device based on the allowed level of access.

25. The method of claim 20, wherein the receiving comprises receiving the information at at least one of an RFID reader, an RFID writer, or an RFID reader/writer.

26. The method of claim 20, the device is at least one the following: a blade; a door; a robot; a machine; a roller; a scanner; a belt conveyor; a pump; a press; a fan; a fly-wheel; or a movable machine part.

27. The method of claim 20, wherein the receiving the signal comprises receiving the signal from a passive ultra high frequency (UHF) RFID tag.

28. A system that facilitates implementing a safety zone to provide a safety mechanism within an industrial automation environment, comprising:
means for receiving data from an RFID tag;
means for identifying a location associated with the RFID tag based on the data;
means for determining an access level associated with the RFID tag based on the data;
means for initiating a slowed operation mode in an industrial device wherein the industrial device operates at a slower speed in comparison with normal operating speed if the access level indicates that access to the industrial device is allowed; and
means for initiating a stopped state in the industrial device if the access level indicates that access to the industrial device is denied.

29. The system of claim 12, wherein the safety component places the industrial device into a stopped state if no RFID tag is detected by the sensor after the entry is detected.

* * * * *